Figure 1:
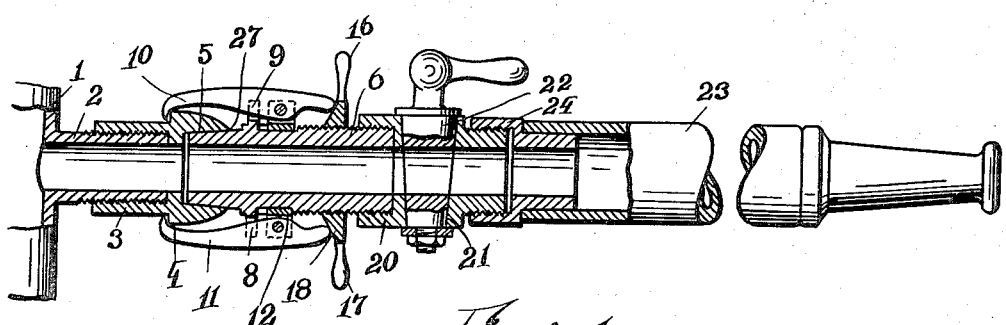

J. A. RIORDAN.
HOSE CONNECTION.
APPLICATION FILED JUNE 7, 1915.

1,187,553.

Patented June 20, 1916.

Witnesses
Eric Schinger.
Edna K. Booth.

Inventor
James A. Riordan.
By Frank Keifer.
Attorney

UNITED STATES PATENT OFFICE.

JAMES A. RIORDAN, OF ROCHESTER, NEW YORK, ASSIGNOR OF THIRTY-FIVE ONE-HUNDREDTHS TO NELLIE G. RIORDAN, OF SALAMANCA, NEW YORK.

HOSE CONNECTION.

1,187,553.

Specification of Letters Patent. Patented June 20, 1916.

Application filed June 7, 1915. Serial No. 32,782.

*To all whom it may concern:*

Be it known that I, JAMES A. RIORDAN, a citizen of the United States, residing at Rochester, in the county of Monroe and State of New York, have invented certain new and useful Improvements in Hose Connections, of which the following is a specification.

The object of this invention is to provide a quick connection between the fireman's hose and a water plug.

Another object of the invention is to dispense with threads and provide a connection that will be universal.

These and other objects of the invention will be fully illustrated in the drawings, described in the specification and pointed out in the claims at the end thereof.

Figure 2:
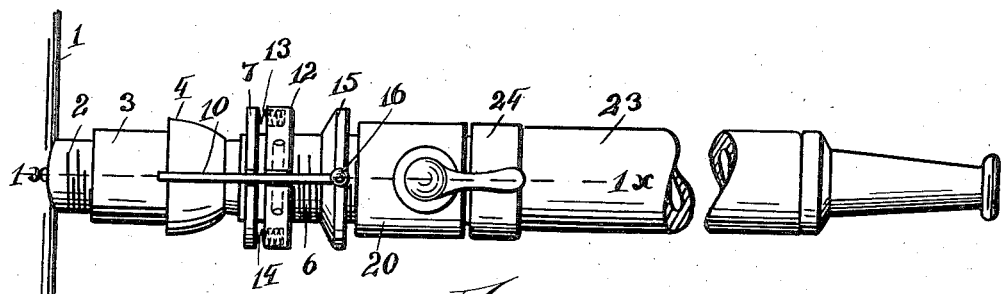
Figure 3:
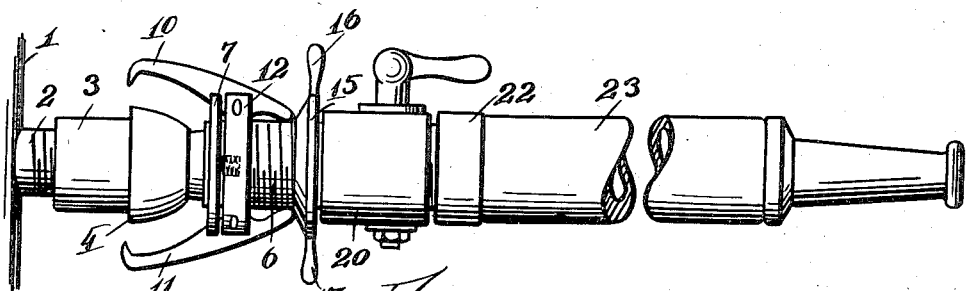

In the drawing, Figure 1 illustrates my improved coupling in section, the section being taken on the line 1×—1× of Fig. 2. Fig. 2 represents a top plan view of my improved coupling. Fig. 3 is a side elevation of the coupling showing the coupling in the process of being connected up.

In the drawings like reference numerals indicate like parts.

In the drawings reference numeral 1 indicates the plug or a hydrant having a nipple 2 integral therewith on which is formed a male thread. On this is screwed a sleeve 3 having a female thread therein, on the forward end of which is formed a shoulder 4. The forward end is formed with a choke bored or tapered seat as indicated at 5.

On the coupling is provided a tube 6 having a male thread thereon, the forward end of which is tapered as indicated at 27 to engage with the tapered opening in the sleeve 3. Integral with the tube 6 is a collar 7 which collar is slotted radially at 8 and 9 to form guides for the dogs 10 and 11 which are pivotally mounted in the collar 12, which is mounted to slide on the tube and which is splined thereon, the tube being left with a plain or cylindrical surface to form a seat for the collar. Between the sliding collar 12 and the rigid collar 7 are provided springs 13 and 14 which hold the collar 12 back.

Mounted to rotate on the threaded tube 6 is the nut 15 having the handles 16 and 17 thereon by which it may be rotated. This nut has a cam surface 18 thereon which engages with the rear ends of the dogs 10 and 11 and serves to push the dogs and collar 12 forward and spread the dogs at the rear end and draw them together at the forward end. These dogs are adapted to engage with the shoulder 4 on the sleeve 3 to which they are locked by the rotation of a nut 15. The forward ends of the dogs are inclined so as to have a cam action on the shoulder and as the dogs are drawn together at the forward end by the rotation of the nut 15 they will draw the tapered portions of the coupling together and make a tight joint.

To the tube 6 is threaded the valve shell 20 having a valve seat 21 therein in which is mounted to turn a valve 22. To the forward end of this valve shell is fastened the hose 23 by means of a coupling 24.

As shown in Fig. 3 the dogs 10 and 11 may be forced apart by hand and are thus disengaged from the shoulder 4 of the female part of the coupling. In doing so the rear end of the dogs slide down the incline of the cam 15 and force the ring 12 forward which in turn compresses the springs 13 and 14 interposed between this ring and the shoulder 7 on the end of the male portion of the coupling. As soon as the dogs are released, when in the position shown in Fig. 3, the springs 13 and 14 expand and force the ring 12 back to its normal position so that the rear ends of the dogs 10 and 11 are compelled to travel back and up the inclined surface of the cam, causing the front end of these dogs to rock into the position shown in Fig. 1 and lock the parts of the coupling together.

The use and operation of my device is as follows: The sleeve 3 is left permanently on the plug and when it is desired to make a connection the tapered end 27 of the coupling is inserted in the tapered opening of the sleeve and the dogs 10 and 11 are moved in engagement with the shoulder 4 and are locked in the engagement therewith by the rotation of the nut 15. As the nut 15 is turned the dogs are drawn together at their forward ends and the cam shaped ends ride down on the shoulder 4 and draw the tapered end 27 of the coupling tight into the tapered seat 5 and hold it there. The valve 22 can be turned to turn the water on or off at will.

I claim:

1. In a hose connection the combination of a sleeve having an annular shoulder around it and a tapered socket in one end thereof, a tube having a tapered end adapted to engage with the tapered socket on the sleeve, guides rigidly mounted on said tube, a collar splined on said tube, dogs pivotally mounted on said collar and adapted to yieldingly engage with the shoulder on said sleeve to draw the tube and sleeve together.

2. In a hose connection the combination of a sleeve having an annular shoulder around it and a tapered socket in one end thereof, a tube having a tapered end adapted to engage with the tapered socket on the sleeve, guides rigidly mounted on said tube, a collar splined on said tube, dogs pivotally mounted on said collar and adapted to yieldingly engage with the shoulder on said sleeve to draw the tube and sleeve together, means for forcing said dogs into engagement with said shoulder.

3. In a hose connection the combination of a sleeve having an annular shoulder around it and a tapered socket in one end thereof, a tube having a tapered end adapted to engage with the tapered socket on the sleeve, guides rigidly mounted on said tube, a collar splined on said tube, dogs pivotally mounted on said collar and adapted to yieldingly engage with the shoulder on said sleeve to draw the tube and sleeve together, a cam nut rotatable on said tube and adapted to engage with said dogs and force them into engagement with said shoulder.

4. In a hose connection the combination of a sleeve having an annular shoulder around it and a tapered socket in one end thereof, a tube having a tapered end adapted to engage with the tapered socket on the sleeve, guides rigidly mounted on said tube, a collar splined on said tube, springs interposed between said collar and said tube to press the collar rearwardly, dogs pivotally mounted on said collar, said dogs having cam shaped ends adapted to yieldingly engage with the shoulder on said sleeve and draw the tube and sleeve together, said dogs engaging with and being held in line by said guides.

5. In a hose connection the combination of a sleeve having an annular shoulder around it and a tapered socket in one end thereof, a tube having a tapered end adapted to engage with the tapered socket on the sleeve, guides rigidly mounted on said tube, a collar splined on said tube, springs interposed between said collar and said tube to press the collar rearwardly, dogs pivotally mounted on said collar, said dogs having cam shaped ends adapted to engage with the shoulder on said sleeve and draw the tube and sleeve together, said dogs engaging with and being held in line by said guides, a cam shaped nut rotatable on said tube and adapted to engage with said dogs and force them into engagement with said shoulder.

6. In a hose coupling the combination of a stationary male and female member, an annular shoulder on the outside of said female member, locking dogs mounted on the outside of said male member to engage with said shoulder on said female member, a longitudinally moving cam for positively moving said locking dogs radially into locking position, and means for yieldingly holding said dogs in this locking position.

7. In a hose coupling the combination of a stationary male and female member, an annular shoulder on the outside of said female member, locking dogs mounted on the outside of said male member to engage with said shoulder on said female member, a cam mounted on the outside of said male member against which the ends of said locking dogs rest, said dogs having a yielding movement along said male member to permit the outer ends of said dogs to be spread apart while the rear ends of said dogs slide down the incline of said cam, means for throwing said dogs back into locking position when released.

8. In a hose coupling the combination of a stationary male and female member, an annular shoulder on the outside of said female member, a collar mounted to slide on the outside of said male member, locking dogs pivotally mounted on said collar to engage with said shoulder on said female member, a longitudinally moving cam for positively moving said locking dogs radially into locking position, and means for yieldingly holding said dogs in this locking position.

In testimony whereof I affix my signature.

JAMES A. RIORDAN.